(12) United States Patent
Campsie et al.

(10) Patent No.: US 10,802,042 B2
(45) Date of Patent: Oct. 13, 2020

(54) MEASUREMENT OF ACCELERATION

(71) Applicant: The University Court of the University of Glasgow, Glasgow (GB)

(72) Inventors: Paul Campsie, Glasgow (GB); Giles Dominic Hammond, Glasgow (GB); Richard Paul Middlemiss, Glasgow (GB); Douglas John Paul, Glasgow (GB); Antonio Samarelli, Glasgow (GB)

(73) Assignee: The University Court of the University of Glasgow, Glasgow (GB)

( * ) Notice: Subject to any disclaimer, the term of this patent is extended or adjusted under 35 U.S.C. 154(b) by 0 days.

(21) Appl. No.: 15/506,675

(22) PCT Filed: Aug. 26, 2015

(86) PCT No.: PCT/EP2015/069572
§ 371 (c)(1),
(2) Date: Feb. 24, 2017

(87) PCT Pub. No.: WO2016/030435
PCT Pub. Date: Mar. 3, 2016

(65) Prior Publication Data
US 2017/0276697 A1    Sep. 28, 2017

(30) Foreign Application Priority Data
Aug. 26, 2014 (GB) .................................. 1415087.4

(51) Int. Cl.
*G01P 15/125* (2006.01)
*G01P 15/13* (2006.01)
(Continued)

(52) U.S. Cl.
CPC .............. *G01P 15/13* (2013.01); *G01P 15/02* (2013.01); *G01V 7/00* (2013.01); *G01V 7/005* (2013.01); *G01V 7/02* (2013.01)

(58) Field of Classification Search
USPC ........................................ 73/514.32, 514.17
See application file for complete search history.

(56) References Cited

U.S. PATENT DOCUMENTS

| | | |
|---|---|---|
| 4,497,206 A | 2/1985 | Scheurenbrand |
| 4,851,080 A | 7/1989 | Howe et al. |

(Continued)

FOREIGN PATENT DOCUMENTS

| | | |
|---|---|---|
| JP | 2004/340858 | 12/2004 |
| JP | 2007/256236 | 10/2007 |

(Continued)

OTHER PUBLICATIONS

FG5-X Absolute Gravity Meter, Microg LaCoste a division of LRS 1-6.

(Continued)

*Primary Examiner* — Lam S Nguyen
(74) *Attorney, Agent, or Firm* — Rudy J. Ng; Bozicevic, Field & Francis LLP

(57) ABSTRACT

An acceleration measuring device is disclosed, for use as a gravimeter or gradiometer for example. The device has a support and a proof mass, connected to each other by at flexures allowing displacement of the proof mass relative to the support. The support defines a space for displacement of the proof mass. The device is configured so that the modulus of the gradient of the force-displacement curve of the proof mass decreases with increasing displacement, for at least part of the force-displacement curve. This is the so-called anti-spring effect. The resonant frequency of oscillation of the proof mass is determined at least in part by the orien- (Continued)

tation of the device relative to the direction of the force due to gravity. The proof mass is capable of oscillating with a resonant frequency of 10 Hz or less. The proof mass has a mass of less than 1 gram.

17 Claims, 13 Drawing Sheets

(51) Int. Cl.
  *G01V 7/00* (2006.01)
  *G01P 15/02* (2013.01)
  *G01V 7/02* (2006.01)

(56) References Cited

U.S. PATENT DOCUMENTS

| | | | |
|---|---|---|---|
| 5,165,279 A | 11/1992 | Norling et al. | |
| 6,196,067 B1* | 3/2001 | Martin | G01P 15/0802 |
| | | | 73/514.32 |
| 6,776,042 B2 | 8/2004 | Pike et al. | |
| 2006/0207326 A1 | 9/2006 | Moody et al. | |
| 2006/0272414 A1* | 12/2006 | Ayazi | B81C 1/00182 |
| | | | 73/514.32 |
| 2009/0228235 A1 | 9/2009 | Carr | |
| 2011/0132088 A1 | 6/2011 | Jenkins et al. | |
| 2013/0255402 A1 | 10/2013 | Koyama et al. | |

FOREIGN PATENT DOCUMENTS

| | | |
|---|---|---|
| JP | 2014/119412 | 6/2014 |
| WO | WO 2003/076970 | 9/2003 |

OTHER PUBLICATIONS

Iphone Memes Accelerometer-(2009) MEMS digital output motion sensor ultra low-power high performance 3-axes "nano" accelerometer LIS331DLH 1-38.
LaCoste Romberg CG-6 brochure_R16.
NIKHEF (2016) National Institute for Subatomic Physics The gravitational physics program Virgo 2 pages.
Reftek Accelerometers 131s Brochure(2007) 2 pages.
Zwahlen et al. (2010) "Navigation grade MEMS accelerometer." Micro Electro Mechanical Systems 631-634.
Zwahlen et al. (2012) "Breakthrough in High Performance Inertial Navigation Grade Sigma-Delta MEMS Accelerometer," Colibrys, Safran sagem 1-21.
Pike et al., (2013) "A Silicon Microeismometer for Mars," 17th Transducers & Eurosensors, IEEE 622-625.
Arlen, Edwin T., et al., (2005) "High-Aspect Ratio Vertical Comb-Drive Actuator With Small Self-Aligned Finger Gaps", Journal of Microelectromechanical Systems, 14(5):1144-1155.

* cited by examiner

MEASUREMENT OF ACCELERATION

CROSS-REFERENCE TO RELATED APPLICATIONS

This application is the U.S. national phase under 35 U.S.C. § 371 of PCT International Application No. PCT/EP2015/069572, which has an international filing date of Aug. 26, 2015 and designated the United States of America, which application claims benefit of priority to GB Application No. 1415087.4, filed Aug. 26, 2014, the disclosures of each of which are incorporated by reference herein.

BACKGROUND TO THE INVENTION

Field of the Invention

The present invention relates to an acceleration measuring device, and a method of operating the device. The invention has particular applicability to the determination of the acceleration due to gravity. The device can therefore be used as a gravimeter. The invention also relates to an arrangement of such devices, in a gradiometer, and to the use of such a gradiometer.

Related Art

Gravimeters are a type of accelerometer, especially adapted for measuring the acceleration due to gravity, which varies by up to about 0.5% of its approximate mean value of 9.81 ms$^{-2}$ across the surface of the Earth. Furthermore, at a fixed location, the local acceleration due to gravity can vary by approximately $2\times10^{-6}$ ms$^{-2}$ daily due to the Earth tides.

The basic principle of a mechanical accelerometer is the same as that of a mass on a spring, inside a casing, the spring being attached to the casing. When the casing undergoes an acceleration, the movement of the mass is subjected to a time lag, as a result of its inertia. In the frame of reference of the casing, i.e. a local inertial frame, the mass is displaced to the point where the spring is able to accelerate it at the same rate as the casing is accelerating, at which point (again, in the frame of reference of the casing), instantaneously, the mass is stationary. If the mass and the spring constant are known, the acceleration can be calculated from a measurement of this displacement. This same principle can be applied to the example of the Earth tides, mentioned in the previous paragraph. Here, a very low frequency signal will be generated (i.e. twice a day, that is, 10-20 micro-Hz), by the changing force on the spring, as a result of the changing tides.

A gravimeter is concerned with the downward acceleration as a result of the Earth's gravitational field, and so is required to be highly sensitive, in order that it can be used to detect tiny fluctuations in the Earth's field of 1 g, (about 9.81 ms$^{-2}$). As a result, a gravimeter should be isolated from external vibrations (such as from seismic activity). This is normally accomplished using a combination of vibration isolation techniques, and signal processing to filter out the seismic signal.

One measure of the sensitivity of accelerometers is in the form of an amplitude spectral density, with units of ng/√Hz, which gives the sensitivity of a measurement made over 1 second. Note that in this disclosure, g refers to the acceleration due to gravity, also known as the gravitational field strength, rather than to the gram unit of mass.

There are two basic types of gravimeter, absolute gravimeters and relative gravimeters.

Absolute gravimeters determine the absolute gravitational field strength. The FG5 absolute gravimeter is an example of this (http://www.microglacoste.com/pdf/Brochure-FG5-X.pdf [accessed 21 Aug. 2014]). It works very simply by dropping a test mass from a known height in a vacuum, and measuring the acceleration (equivalent to gravitational field strength) of the test mass as it falls, using a laser interferometer. This is able to provide a measurement with no prior calibration. As shown in FIG. 12, the FG5 can provide extremely sensitive measurements, of the order of 2 ng/√Hz, with precision of about 15 ng/√Hz, however, the machinery weighs 150 kg, and is extremely expensive. Due to their size and weight, absolute gravimeters are usually very difficult to transport, and are often not portable at all.

Relative gravimeters are far more common. These can provide a measurement of the gravitational field strength as a proportion of a known gravitational field strength, and so are often calibrated beforehand using an absolute gravimeter. The LaCoste Romberg CG5 (http://www.scintrexltd.com/documents/CG-5BrochureRev1.pdf [accessed 21 Aug. 2014]) relative gravimeter uses a zero-length spring to ensure that the period of oscillation of the gravimeter is as long as possible, leading to improved sensitivity. The sensing in this device is electrostatic. It is far smaller than the absolute gravimeter discussed above, with a mass of around 8 kg. The sensitivity is also reduced, however (see FIG. 12). These devices are also expensive to manufacture and purchase.

Smartphones often contain micro-electromechanical (MEMS) accelerometers in order to detect the orientation of the screen, amongst other things. The iPhone 3 used an ST Microelectronics LIS331DL accelerometer. This has a high resonant frequency of the order of a few hundred Hz. Such accelerometers are not considered to be highly sensitive.

In Zwahlen et al (2010) [P. Zwahlen, A-M. Nguyen, Y. Dong, F. Rudolf, M. Pastre, H. Schmid. "Navigation grade MEMS accelerometer." *Micro Electro Mechanical Systems (MEMS)*, 2010 IEEE 23rd International Conference on, pp. 631-634. IEEE, 2010], a MEMS accelerometer is described. This device has a top and bottom electrode located either side of a middle electrode. The middle electrode functions as the proof mass, and can oscillate out of the plane of the system. The extent of the oscillation of the mass is then monitored using capacitive sensing. This device has a sensitivity of only about 2000 ng/√Hz.

The SERCEL 428XL is a commercially available MEMS accelerometer with a sensitivity of 40 ng/√Hz in the range 10-200 Hz. There are several models, the lightest being 0.35 kg with a power consumption of 2.8 W. The resonant frequency is not available and there is no information published to suggest that this has the stability sufficient to measure the Earth tides.

FIG. 12 shows a comparison of the above-described accelerometers and gravimeters in terms of the instrument mass, approximate cost, and sensitivity in ng/√Hz. The size of the bubbles is representative of the cost of the devices.

SUMMARY OF THE INVENTION

The present inventors consider that it would be useful to make accelerometers and gravimeters more portable, by substantial size reduction. Known micro-scale accelerometers have the disadvantage that, even though they are reduced in weight by several orders of magnitude when compared, for example, to the gravimeter devices described above, their sensitivity is much reduced, and their resonant frequencies are far higher. Higher resonant frequency systems give a smaller mass displacement for a given applied acceleration than an otherwise identical system with a lower resonant frequency. In the present application, "resonant frequency" refers to the lowest frequency at which the proof mass would oscillate when a small impulse is applied to the proof mass, e.g. by displacing and releasing it, with no external driving frequency.

The present invention has been devised in order to address at least one of the above problems. Preferably, the present invention reduces, ameliorates, avoids or overcomes at least one of the above problems.

Specifically, the present inventors have devised an approach combining a proof mass of small mass with an arrangement having a low resonant frequency.

Accordingly, in a first preferred aspect, the present invention provides an acceleration measuring device having a support and a proof mass, connected to each other by at least two flexures allowing displacement of the proof mass relative to the support, the support defining a space for displacement of the proof mass, the device being configured so that the modulus of the gradient of the force-displacement curve of the proof mass increases with increasing displacement, for at least part of the force-displacement curve, wherein, the resonant frequency of oscillation of the proof mass is determined at least in part by the orientation of the device relative to the direction of the force due to gravity, such that the proof mass is capable of oscillating with a resonant frequency of 10 Hz or less, and wherein the proof mass has a mass of less than 1 gram.

A second aspect of the invention provides a use of the device of the first aspect of the invention, which includes the steps of allowing a force, such as the force due to gravity, to generate a displacement of the proof mass, and determining the force acting on the proof mass, or the resulting displacement of the proof mass.

A third aspect of the present invention provides a method of manufacturing the device of the first aspect including the step of forming the support, flexures and at least part of the proof mass via a subtractive process from a monolith.

A fourth aspect of the present invention provides an arrangement of three or more devices of the first aspect of the invention, oriented so that a plane of oscillation of each device, in which plane each device is adapted to measure acceleration, is not parallel to the plane of oscillation of another one of the devices.

In this arrangement, the device can simultaneously measure acceleration in more than one spatial dimension, preferably three spatial dimensions, whereas a single device is typically limited to measurement in a single spatial dimension at a time. Such an arrangement of devices allows the device to function as an accelerometer for use in inertial navigation sensors, for example. In the preferred embodiments of the invention, the flexures are soft and thus the proof mass can be easily displaced, e.g. by a 1 g field. It is preferred therefore that the proof mass is constrained substantially to move only in one plane, more preferably constrained substantially to move only along one direction. However, this means that a single device is limited to measurement in a single spatial dimension at a time. In a particularly preferred embodiment, the respective directions of sensitivity of the devices are arranged along orthogonal axes.

A fifth aspect of the present invention provides a gradiometer including an array of devices according to the first aspect, or an array of arrangements according to the fourth aspect, of the present invention.

Combining two or more preferably identical devices (or arrangements) in this way, the effects of inertial noise and/or seismic accelerations can be reduced or removed, and allow detection of very small spatial variations in the gravitational field in a region. While each device does function as a gravimeter in its own right, the gradiometer array greatly improves the accuracy of the measurement.

FIG. 11 shows a schematic arrangement to demonstrate the operating principle of a gradiometer. The device at x measures an acceleration of $g(x)+\alpha \ddot{x}$, wherein the second term comes from external ground accelerations. The device at x+dx measures an acceleration of $s(x+dx)+\beta \ddot{x}$. $\alpha$ and $\beta$ are constants representing the strength of the ground acceleration. Ensuring $\alpha=\beta$ (by tuning the devices so that they respond identically to the ground acceleration) means that the effects of the external vibrations on each device are identical, and the difference in the readings between the two devices therefore gives $g(x+dx)-g(x)$. If the two devices are spaced over a baseline L, then a gradient in the gravitational field strength over that baseline can be expressed as:

$$\frac{dg(x)}{dL} = \frac{1}{L}(g(x+dx) - g(x))$$

In order to do this, preferably, in the array of devices, the devices are rigidly fixed relative to each other using a spacer so as to keep their relative spacing constant throughout any measurement taken. More preferably, this spacer is made of a material which has a low coefficient of thermal expansion, in order to ensure that the relative spacing of the devices within the array is substantially unchanged with a change in temperature. The spacer is preferably made from ultra-low-expansion glass.

Preferably the spacing of the devices is at least 0.05 m. The spacing of the devices may be at most 0.2 mA spacing of about 0.1 m is suitable, for example. In such a configuration, the devices are sufficiently far apart that they are sensitive to gradients, but not so far apart that there is a risk of environmental effects such as temperature and rotational acceleration from detrimentally affecting the measurements. A spacing of 0.2 m or less also allows the devices to be connected with the rigid spacers as described above, more preferably the ultra-low-expansion glass spacers.

The first, second, third, fourth and/or fifth aspect of the invention may have any one or, to the extent that they are compatible, any combination of the following optional features. Additionally, any one of these aspects may be combined with any other one of these aspects.

Preferably the proof mass has a mass of less than 0.5 grams. More preferably the proof mass has a mass of less than 0.1 grams.

Preferably, the resonant frequency of oscillation of the proof mass decreases as the device is tilted out of the plane perpendicular to the direction of the force due to gravity.

The proof mass may have a frequency of at most 50 Hz when the device is oriented perpendicular to the direction of the force due to gravity. More preferably, when the device is oriented perpendicular to the direction of the force due to gravity, the proof mass has a resonant frequency of at most 20 Hz. In some embodiments, when the device is oriented perpendicular to the direction of the force due to gravity, the proof mass may have a resonant frequency of at most 10 Hz.

The device may include two or more pairs of flexures. When two or more pairs of flexures are used, undesirable oscillatory modes such as sideways and tilting modes can be suppressed. Using two or more pairs of flexures can constrain the oscillation to have substantially one degree of freedom. Indeed, use of two or more pairs of flexures can ensure that the sideways/tilting modes are stiffer than the fundamental, linear mode by a factor of about 30-40.

"Modulus of the gradient of the force-displacement curve" refers to the mathematical modulus of the gradient, i.e. |dF/dz|, of the force-displacement curve with force, F, plotted on the ordinate, and displacement, z, plotted on the abscissa. It is intended here that displacement (and/or force) could be selected to be measured to be negative values, hence the reliance on the mathematical modulus of the slope of the curve. It is further intended that the flexures operate only in the elastic domain.

Preferably, the arrangement of the flexures, the support and the proof mass results in a so-called "anti-spring" effect. In this arrangement, the proof mass is more easily displaced, i.e. appears to be supported by "softer" springs, with increased displacement. The apparently softer flexures result in a lower resonant frequency. Therefore, the more the flexures are loaded (within the range of movement envisioned for the proof mass), the lower the frequency of oscillation and the greater the sensitivity of the device.

The device may preferably include three flexures. Preferably, the number of flexures is exactly three. Surprisingly, the present inventors have found that this provides improved performance compared with using one pair of flexures (i.e. two flexures) or two pairs of flexures (i.e. four flexures). Using three flexures can promote displacement of the proof mass towards the support in a manner that limits the anti-spring effect at higher displacements. In turn, this can avoid instability in the operation of the device.

Preferably, each flexure is connected at one end to the proof mass, and at the other end to the support. In order to ensure that the flexures can be as long as possible in the space available between the proof mass and the support, more preferably the flexures are connected to the proof mass at a position further removed from the support than the closest part of the proof mass to the support. In order to assist with this, the proof mass may include at least one projection portion, projecting from the proof mass to form a connection with the flexure.

Preferably, the length of each flexure is at least 25% of the distance between opposing sides of the support. The flexures may be at most 50% of the distance between opposing sides of the support. A longer flexure is beneficial as this results in a lower resonant frequency than a shorter one made of the same material, and with identical cross sectional shape. Preferably, the two flexures are identical. The device may be symmetrical about a central plane, with one flexure on each side of that plane. Where four flexures are provided, for example, there are preferably two substantially identical flexures on opposing sides of the plane of symmetry. In this way, the proof mass is constrained to oscillate along a substantially linear path, allowing a simple measuring process. This is called the 4 flexure embodiment of the device.

It has been found by the inventors that operation of the 4 flexure embodiment can result in a resonant frequency which continually decreases (the modulus of the force displacement curve tending to zero). Under large ground acceleration the proof mass may in some circumstances become unstable, by hitting the lower frame. This configuration is still of significant interest, however, in particular where the device is operated using a closed loop feedback system to maintain the device at a stable operating point but with low resonant frequency. This is described in more detail below.

As an alternative to the 4 flexure geometry, the present inventors propose a 3 flexure geometry, as briefly mentioned above. In this embodiment, two flexures are used to form the antispring while the third flexure in effect acts as a guiding cantilever (this is discussed further below with reference to FIG. 4). The benefit of this type of device is that the geometrical antispring is still formed as the proof mass is displaced from its equilibrium position, thus lowering the resonant frequency. However, as the device is further displaced the third guiding flexure pushes the proof mass away from the longitudinal axis P of the device, limiting the ultimate softness of the geometrical antispring. In this way the device has a lowest resonant frequency but at the same time is stable. This allows a closed loop feedback system to be omitted if desired. This simplifies the manufacture and operation of the device. If this minimum operating resonant frequency is chosen to be parallel to the gravitational field then the device has the benefit that the lowest resonant frequency coincides with the operating point of the gravimeter. Thus, to provide a system that is stable and without requiring a feedback loop, it is possible to use three flexures rather than four. This allow lower frequencies to be reached as the cantilever structure acts in a similar way to a feedback loop: as the force displacement asymptotically tends to zero the isolated flexure pushes the system away from its vertical position. This lateral force counterbalances the system.

The device is preferably configured to allow the proof mass to oscillate substantially only within one plane. Combining this with the fact that the anti-spring effect becomes more significant as the flexures become increasingly loaded (also referred to as "gravitational loading"), this means that the resonant frequency of oscillation of the proof mass can be adjusted to a chosen frequency by adjustment of the angle of tilt between the plane of oscillation and the direction of the force due to gravity. By tilting the device in the Earth's gravitational field, the resonant frequency may be reduced to $f_{tilt}/f_{perp}$, where $f_{tilt}$ is the resonant frequency of the device when tilted or parallel to the Earth's gravitational field and $f_{perp}$ is the resonant frequency of the device when perpendicular to the Earth's gravitational field. Preferably, $f_{tilt}/f_{perp}$ is at most 0.9. More preferably, $f_{tilt}/f_{perp}$ is at most 0.8, at most 0.7, at most 0.6, at most 0.5 or at most 0.4. In preferred embodiments of the invention, $f_{tilt}/f_{perp}$ has been measured to be as low as 0.07. Preferably, the lowest value of $f_{tilt}/f_{perp}$ is achieved when the direction of the force due to gravity lies in the plane of oscillation. The inventors are aware that an optimum degree of tilt is that which minimizes the resonant frequency of oscillation of the proof mass without sacrificing sensor accuracy, nor being over-sensitive to external ground accelerations, nor causing the proof mass to impact the support and/or flexures.

Other known devices pre-load their flexures before use, thereby providing an anti-spring effect, but these do so using a thermal heater and ratchet. Furthermore, these devices are not able to achieve frequencies as low, and/or formats as small, as the preferred embodiments of the present invention.

Preferably, each flexure has a rest shape extending in a continuous arc defining a length direction of the flexure from the support to the proof mass. By "rest shape", it is meant the shape of the flexure when the device is oriented such that the plane of oscillation is perpendicular to the direction of the force due to gravity, i.e. with no additional gravitational loading. The geometry of the flexures gives rise to desirable effects of the invention. A width direction of the flexure is defined as a direction in the plane of oscillation of the proof mass and perpendicular to the length direction. A depth direction is defined as a direction perpendicular to the plane of the oscillation of the proof mass and perpendicular to the length direction.

Preferably, the ratio of the depth of the flexure to the width of the flexure is at least 10:1, more preferably at least 15:1 and still more preferably about 20:1 or higher. This allows the flexure to bend easily in response to an applied force or acceleration, in the plane of oscillation of the proof mass, but due to the thickness in the depth direction, the proof mass is confined to oscillate substantially in the desired plane.

Preferably, the width of the flexure, on average along the length of the flexure, is at most 25 μm, more preferably at most 15 μm, more preferably at most 10 μm, and still more preferably at most 7 μm.

Preferably, the depth of the flexure, on average along the length of the flexure is at least 50 μm, more preferably at least 100 μm, and still more preferably at least 150 μm. It is possible for the depth of the flexure to be substantially greater, for example at least 200 μm or at least 300 μm.

Each flexure may have a cross sectional shape perpendicular to the length direction of the flexure, the shape having a width which varies with depth. Preferably, the cross section has a tapering shape, in the depth direction. In this way, the stiffness of the flexure to out-of plane oscillation can be maintained to be sufficiently high. In addition to this, however, a tapering cross section allows the overall softness of the flexure to be increased. A softer flexure results in a lower resonant frequency for in-plane oscillation and allows easy gravitational pre-loading using the proof mass. The flexure may for example have a substantially triangular, or more preferably trapezoidal, cross-section. In this case, one side of the cross-section may be substantially parallel to the plane of oscillation of the proof mass. For example, where the cross section is trapezoidal, one side may have a width of about 7 μm and the opposite parallel side may have a width of about 4-5 μm.

The flexures may, alternatively, have a substantially rectangular cross-section. Preferably, in this case, the shorter sides of the rectangle are substantially parallel to the plane of oscillation of the proof mass, and the longer sides are substantially perpendicular to the same plane.

Preferably, the support and flexures of the device are integrally formed. More preferably, the support, flexures and at least part of the proof mass are integrally formed. The proof mass may have an additional component, added to increase the mass of the proof mass.

It is preferable that the device is manufactured by a subtractive process from a monolith. Here, "subtractive process" refers to any process wherein material is selectively removed from the monolith in a controlled manner. Preferably the device is manufactured by etching. A suitable etching process may include a lithographic step, preferably a photolithography step, to define the shape to be etched. The monolith preferably includes silicon, and more preferably, the monolith is a silicon wafer or substrate. When the device is monolithically formed from a silicon wafer or substrate, it can easily be incorporated into an integrated circuit or onto a chip. Lithography and selective etching of silicon wafers is a well-established technical field and allows the flexures to be formed with very small width, relatively long length and with a depth defined by the thickness of the silicon wafer.

Preferably, the flexures are formed in their curved arcuate shape, for example by the subtractive process from a monolith. In this case, the pattern used to form the device includes curved arcuate shapes corresponding to the intended shape of the flexures.

The device may include displacement determination means for determining displacement of the proof mass relative to the support.

The device preferably further includes actuation means adapted to cause counter displacement of the proof mass by applying a counteracting force. When there is a change in the force due to gravity acting on the proof mass, as the device is moved to a region where the gravitational field strength is different for example, the different gravitational field strength tends to cause a displacement of the proof mass. Preferably, the device includes means for measuring the counteracting force. Preferably, a measurement of a value representative of the counteracting force required to maintain the position of the proof mass is used to determine the local force due to gravity. In this way, the device operates with no moving parts, which improves the stability and reliability of the device. The actuation means may include an electrostatic component to apply the counteracting force. The actuation means may include another type of servocontrol mechanism.

As indicated above, the use of the device preferably further includes the step of countering displacement of the proof mass by applying a counteracting force, in order to determine the force acting on the proof mass. Preferably, a closed-loop feedback system is employed to maintain the position of the proof mass relative to the support, the input required to do so providing a signal representative of the force on the proof mass. More preferably, this position is maintained by applying an electrostatic force to the proof mass. As mentioned previously this may be particularly preferred for the 4 flexure embodiment of the device.

Preferably, the use of the device also includes the step of tilting the device out of the plane perpendicular to the direction of the force due to gravity, thereby decreasing the resonant frequency of oscillation of the proof mass. In this way, the device can be "tuned" to a desirable resonant frequency depending on the desired sensitivity of the device for a particular measurement. Where possible, it is desirable to ensure that the minimum resonant frequency is coincident with the vertical arrangement, where the device can be operated as a gravimeter. This is preferred, for example, for the 3 flexure embodiment.

Measurement is preferably carried out over a timescale of at least 1 s, more preferably at least 10 s, and still more preferably at least 30 s. Carrying out a measurement using the device over a longer timescale clearly produces more accurate results, provided the rate of change of the acceleration being measured is very slow, as random noise can be accounted for, improving the signal-to-noise ratio. This allows the device to operate on the ground by filtering out the short term seismic noise.

Preferably, the device has a measurement sensitivity of at most 40 ng/√Hz, more preferably at most 30 ng/√Hz, more preferably at most 20 ng/√Hz, more preferably at most 10 ng/√Hz and still more preferably at most 5 ng/√Hz.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS, AND FURTHER OPTIONAL FEATURES OF THE INVENTION

Figure 1:
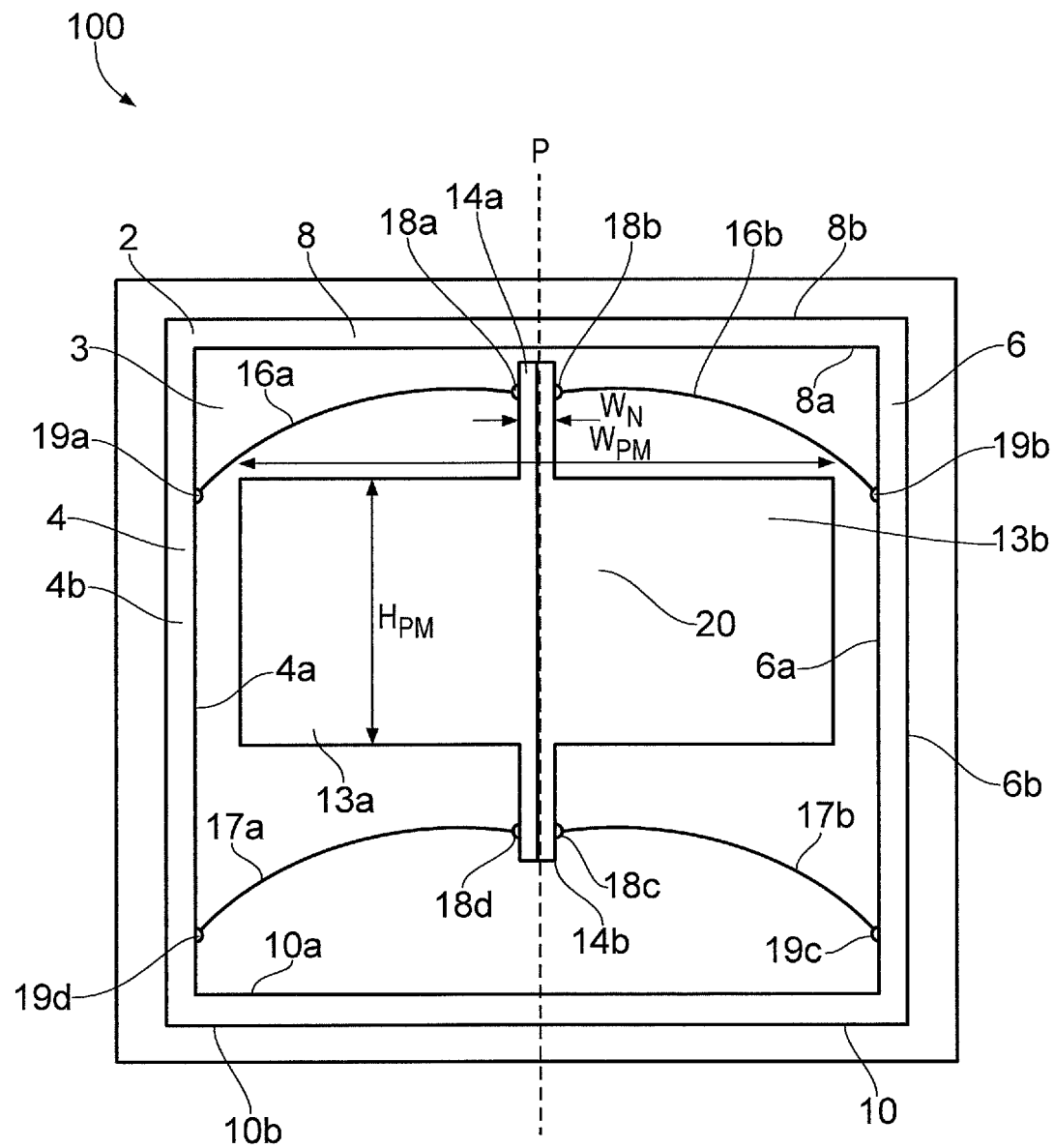
FIG. 1 shows a plan view of a preferred embodiment of the device according to the first aspect of the invention. This is the 4 flexure embodiment.
Figure 4:
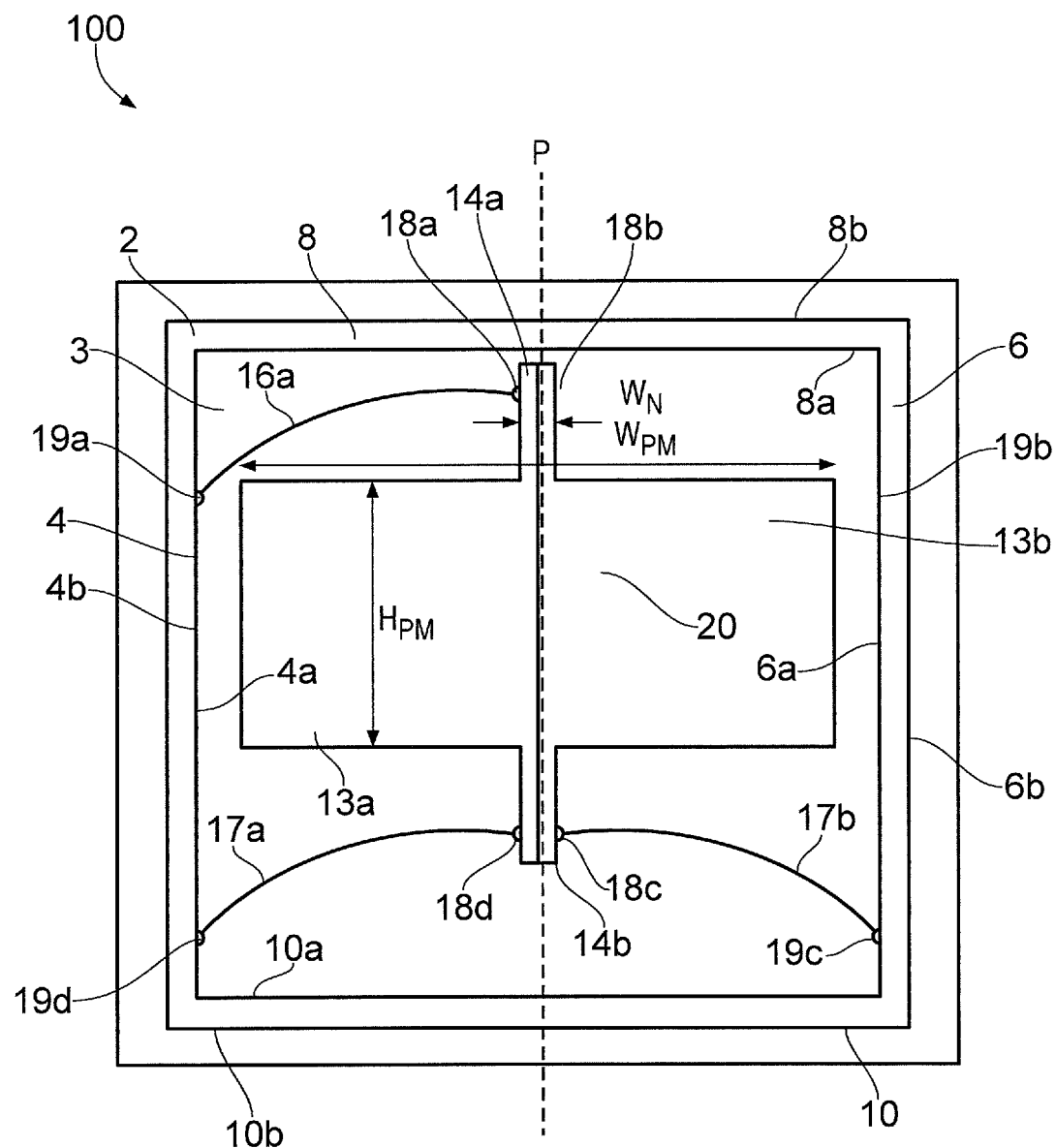
FIG. 4 shows a plan view of a modified embodiment of the device according to the first aspect of the invention. This is the 3 flexure embodiment.

FIG. 1 shows an embodiment of an acceleration-measuring device 100 according to the present invention. This device 100 is fabricated from a 200 μm thick single crystal silicon wafer. This is the 4 flexure embodiment. FIG. 4 shows the 3 flexure embodiment. Similar features are indicated with identical reference numbers in each embodiment.

The support of the device is formed by rectangular frame 2, composed of four members 4, 6, 8, 10. Members 4, 6 are opposite and parallel, separated by approximately 11.5 mm. Members 8, 10 are also opposite and parallel, and separated by approximately 11 mm. In the present embodiment, members 4, 6, 8, 10 are integrally formed, the entire device (apart from part of the proof mass discussed below) being selectively etched from the silicon wafer. Member 4 has an inner surface 4a and an outer surface 4b. Member 6 has an inner surface 6a and an outer surface 6b. Member 8 has an inner surface 8a and an outer surface 8b. Member 10 has an inner surface 10a and an outer surface 10b. The rectangular frame 2 is arranged so that surface 4a is opposite surface 6a, and surface 8a is opposite surface 10a, forming a space 3 for the features of the device discussed below.

In space 3 defined by rectangular frame 2 is located proof mass 12. Proof mass 12 is rectangular in plan view, with dimensions $W_{PM} \times H_{PM}$. In one embodiment, $W_{PM}$ is 7 mm and $H_{PM}$ is 6.5 mm. However, in the illustrated embodiment, it is found that it is advantageous for the ratio $W_{PM}:H_{PM}$ to be relatively large, in order to avoid contact between the flexures and the proof mass at large displacements. Proof mass 12 has two projection portions 14a and 14b respectively at opposing ends. The width $W_N$ of these projection portions 14a, 14b is about 0.5 mm, substantially less than the width of the proof mass $W_{PM}$. Central portion 20 of the proof mass extends from the surface of the proof mass 12 out of the plane of the page. Central portion 20 is added to increase the mass of the proof mass 12 without having to increase its dimensions in the plane of the page. To increase these dimensions would restrict the extent to which the proof mass 12 could oscillate in response to an applied impulse. Furthermore, if the proof mass 12 has dimensions in the plane of the page which are not significantly smaller than the size of the centre space 3 defined by the frame 2, then when the device is tilted further away from the plane perpendicular to the direction of gravity, the proof mass 12 may touch the inner surface 10a of the bottom member 10 of the frame 2, or flexures 17a, 17b. This is clearly an undesirable effect.

The device has two pairs of flexures 16a, 16b and 17a, 17b, which are integrally formed with the frame 2 and proof mass 12. In one mode of operation, when the device is subjected to a change in the force due to gravity, the proof mass 12 tends to be displaced and the flexures 16a, 16b, 17a, 17b become more flexed.

Flexures 16a and 16b are situated opposite each other, and flexures 17a and 17b are situated opposite each other. The end of each flexure 16a, 16b, 17a, 17b which is integrally formed with the respective inner surfaces of the frame 4a, 6a is wider than the rest of the flexure. These frame attachment portions 19a, 19b, 19c, 19d provide increased connection strength between the flexures 16a, 16b, 17a, 17b and the inner surfaces of the frame 4a, 6a and in particular reduce the likelihood of crack nucleation and propagation which would otherwise lead to failure of the device. In the embodiment of the device 100 shown in FIG. 1, the attachment portions are substantially trapezoidal.

The end of each flexure 16a, 16b, 17a, 17b opposite to its respective frame attachment portion 19a, 19b, 19c, 19d is connected to a respective projection portion 14a, 14b. Flexures 16a, 16b are connected to projection portion 14a, and flexures 17a, 17b are connected to projection portion 14b. The flexures 16a, 16b, 17a, 17b are each connected to their respective projection portion 14a, 14b by an attachment portion 18a, 18b, 18c, 18d of the flexure. Similar to the frame attachment portions 19a, 19b, 19c, 19d, these are wider sections of the flexures 16a, 16b, 17a, 17b which provide an increased connection reliability between the respective flexures 16a, 16b, 17a, 17b and projection portions 14a, 14b. The projection attachment portions 18a, 18b, 18c, 18d of the flexures 16a, 16b, 17a, 17b each have a gradually widening curved shape, which ends in a substantially rectangular section with two opposite parallel surfaces which each contact the projection portion 14a, 14b at or close to a right angle. Connecting the flexures 16a, 16b, 17a, 17b to projection portions 14a, 14b instead of to the outer sides 13a, 13b of the proof mass 12 allows the flexures 16a, 16b, 17a, 17b to be longer, and therefore more easily bent under gravity.

In this embodiment, the flexures 16a, 16b, 17a, 17b have continuous arcuate shapes, running between the frame 2 and the neck portions 14a, 14b. The arcuate shapes are such that if, in the presence of an increased gravitational field and/or when the device 100 is oriented such that the plane of oscillation is substantially parallel to the direction of the force due to gravity, the flexures 16a, 16b, 17a, 17b do not contact the proof mass 12 as it is displaced to a lower position, as this would disrupt any measurements made.

Figure 3:
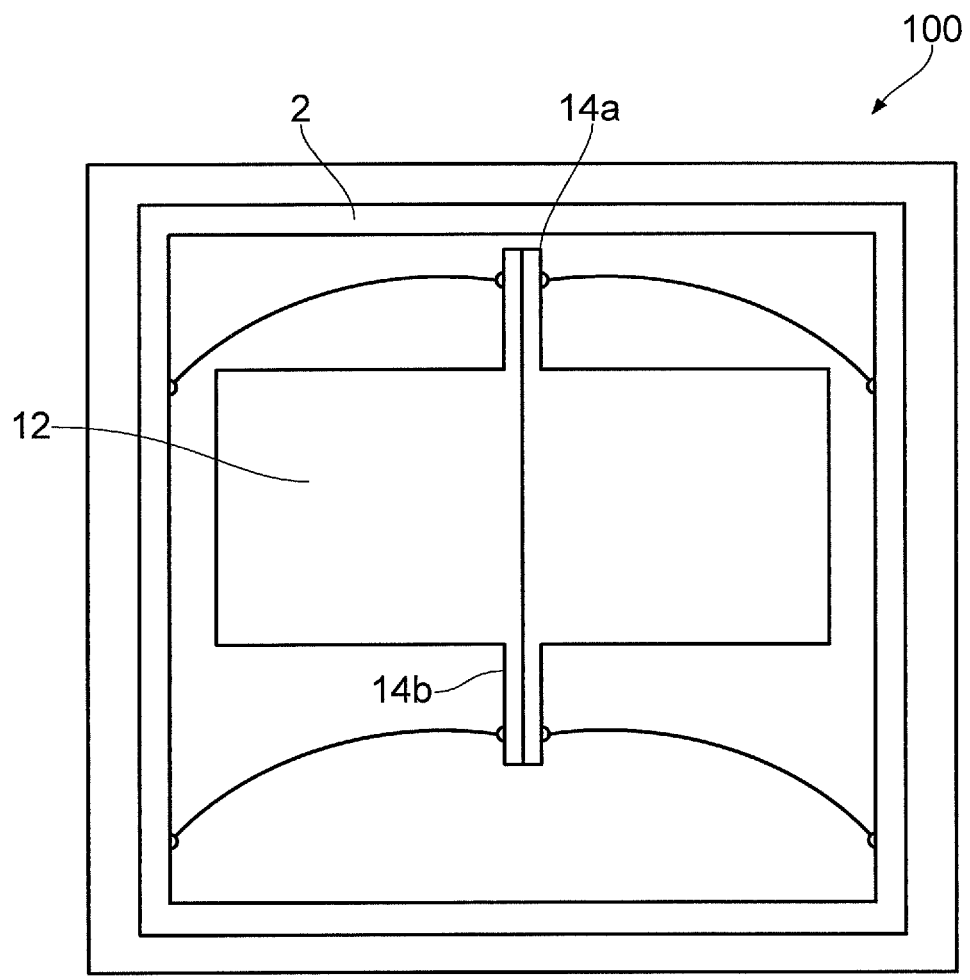
FIG. 3 shows a simplified view compared with FIG. 1.

A simplified drawing of the same embodiment is shown in FIG. 3, but with fewer reference numbers to aid identification of the features of the device.

Returning now to FIG. 1, the device 100 is symmetrical about plane of symmetry P. As a result of this symmetrical arrangement with two pairs of flexures 16a, 16b, 17a, 17b, the proof mass 12 is confined substantially only to be able to oscillate linearly, with rotational or tilting oscillatory modes substantially suppressed.

Figure 2:
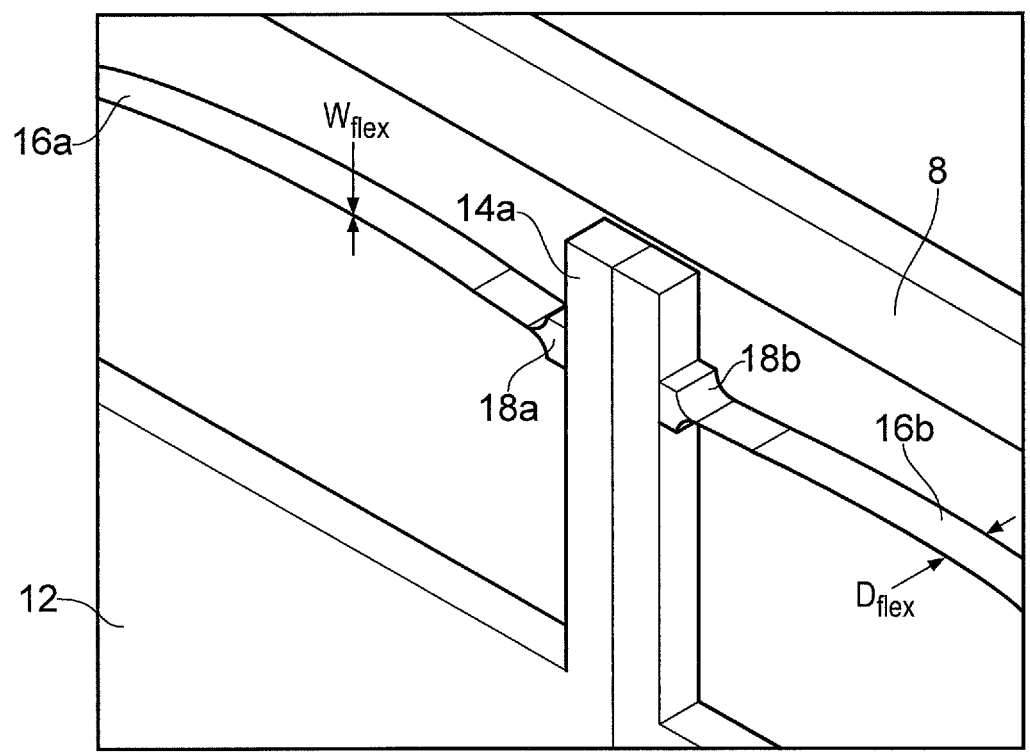
FIG. 2 shows a perspective, close-up view of the top of the proof mass of the device shown in FIG. 1.

FIG. 2 shows a close-up view of the section of the device surrounding projection portion 14a. This drawing shows the structure of the attachment portions 18a, 18b in more detail, in particular their tapering shape. FIG. 2 also shows more clearly the relative dimensions of the flexures 16a, 16b in this embodiment. In this embodiment of the device 100, all of the four flexures 16a, 16b, 17a, 17b are substantially identical, so a description of the dimensions of one can apply equally to any of the remaining three. The "depth direction" is shown by the "d" axis, the "width direction" is shown by the "w" axis, and the "length direction" is shown by the "l" axis. In FIG. 2, the width of the flexure 16a is given by $W_{flex}$, the depth is given by $D_{flex}$ and the complete length is not shown. The length corresponds to the entire curved length of the arcuate flexure 16a, and in this embodiment is about 5 mm. In FIG. 2, a cross sectional profile of the flexure 16a is triangular, or more preferably trapezoidal (or near-rectangular) with a base defined by $W_{flex}$=7 µm, and a maximum extent of $D_{flex}$=220 µm, corresponding to the thickness of the silicon wafer from which the device is fabricated. The triangular or trapezoidal shape tapers away in the depth direction from 7 µm to less than 7 µm.

Figure 5:
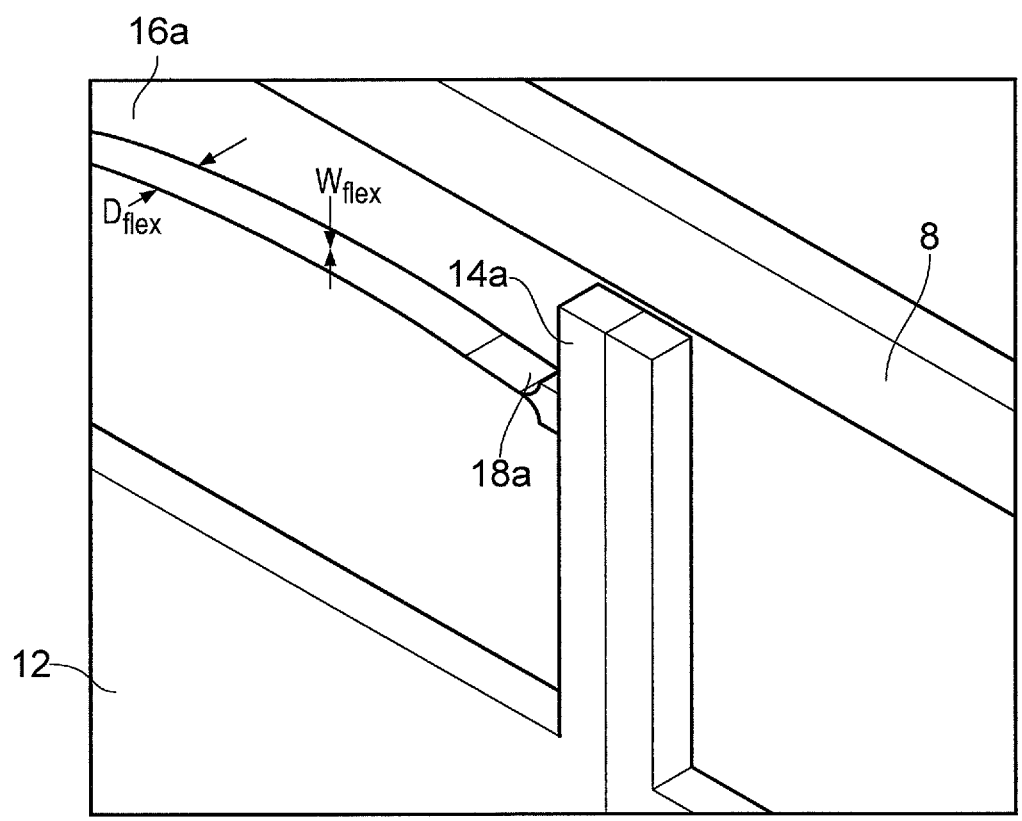
FIG. 5 shows a perspective, close-up view of the top of the proof mass of the device shown in FIG. 4.
Figure 6:
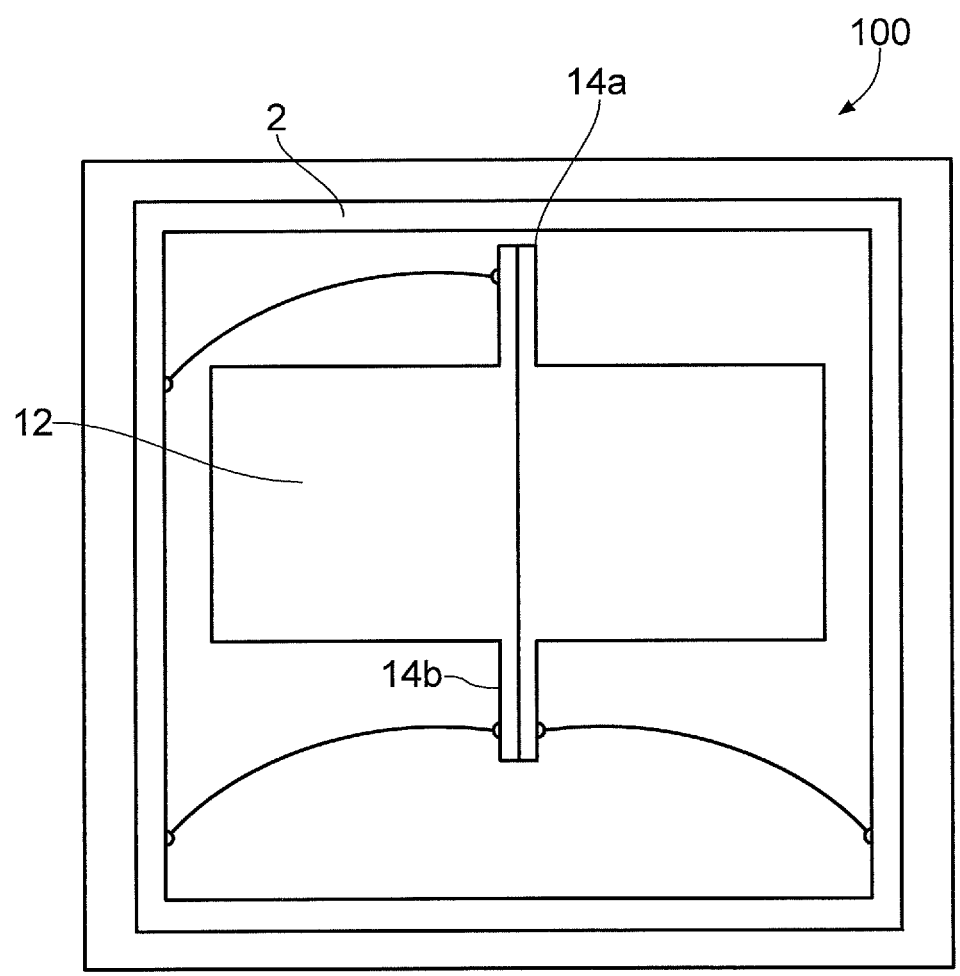
FIG. 6 shows a simplified view compared with FIG. 4.

FIG. 4 shows a preferred embodiment of an acceleration-measuring device 100 according to the present invention. This device 100 is fabricated from a 200 µm thick single crystal silicon wafer. This is the 3 flexure embodiment. Similar comments apply here as to the 4 flexure embodiment. The advantage of omitting one of the flexures from the 4 flexure embodiment to arrive at the 3 flexure embodiment are explained above, and discussed further below. FIGS. 5 and 6 apply to FIG. 4 as FIGS. 2 and 3 apply to FIG. 1, and so are not discussed further here.

Figure 7:
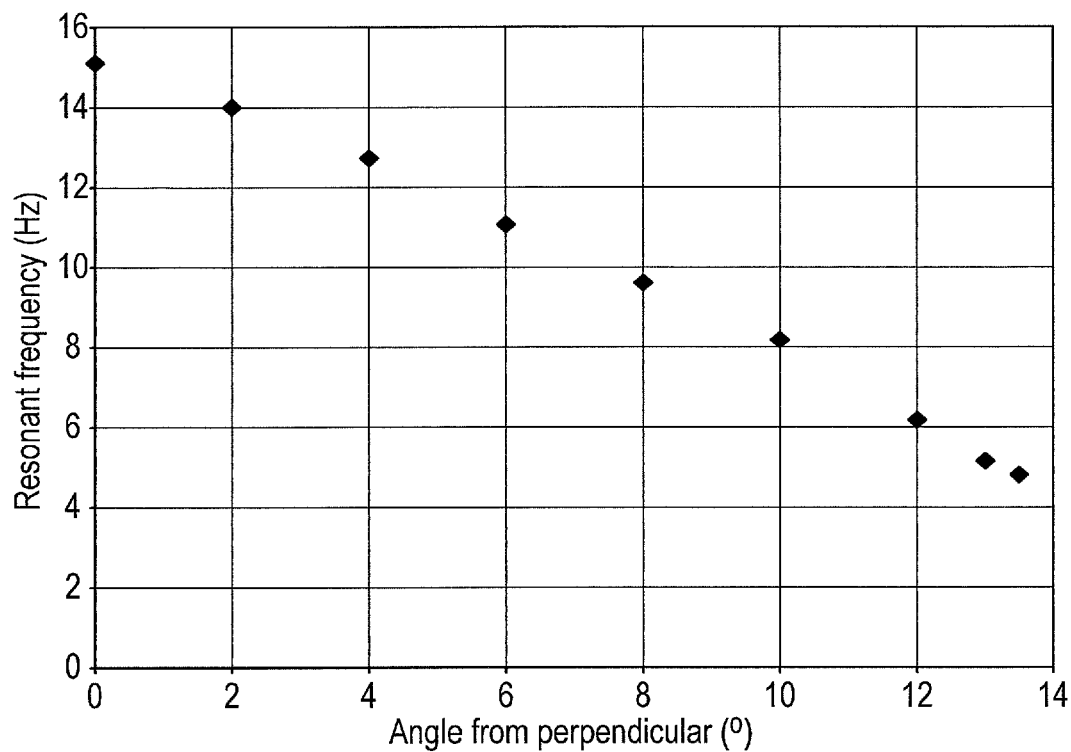
FIG. 7 shows a graph of the variation of the resonant frequency of oscillation of the proof mass for a 4 flexure embodiment of the invention, depending on the angle between the plane of oscillation of the proof mass and the plane perpendicular to the direction of the force due to gravity.
Figure 14:
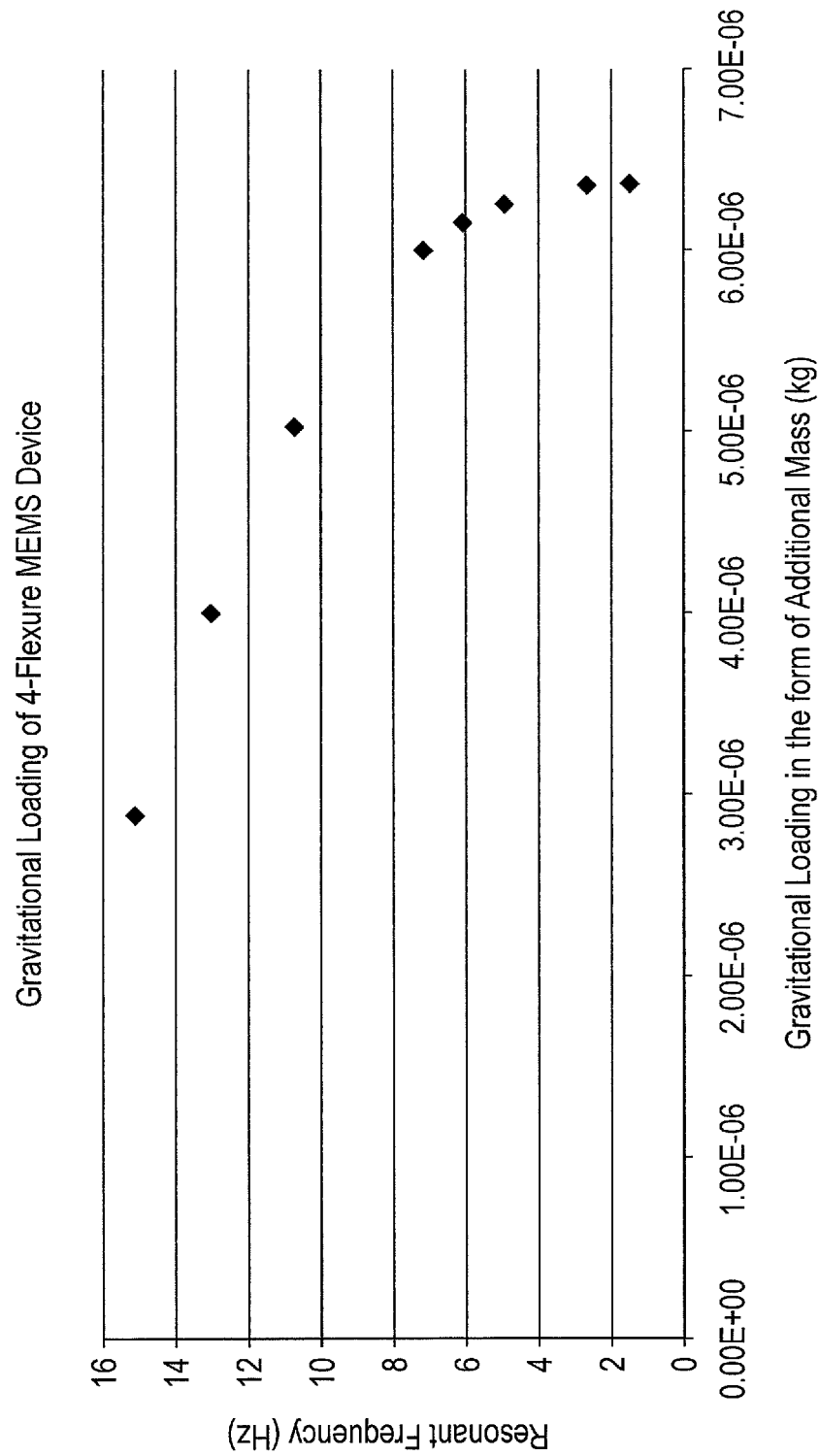
FIG. 14 shows plot of resonant frequency for a 4 flexure device with variation in gravitational loading (here additional mass loading). The lowest resonant frequency corresponds to the greatest mass loading, which has a similar effect to the device being tilted parallel to the gravitational field.

FIG. 7 shows a graph of the variation of the resonant frequency of oscillation of the proof mass 12 with respect to the frame 2 of the embodiment of FIG. 1, as the angle of the plane of oscillation (which in this case is parallel to the front surface of the frame 12) is increased from zero (zero here corresponding to perpendicular to the direction of the force due to gravity). The graph clearly shows a trend wherein the resonant frequency decreases with increased tilt angle. In a position with no tilt (i.e. the plane of oscillation lying horizontally) the resonant frequency is around 15 Hz, decreasing to just below 5 Hz when the device is tilted by 14°. This is a trend which continues as the device is tilted all the way to 90°, at which point the flexures 16a, 16b, 17a, 17b are maximally loaded, and therefore at their "softest", giving the lowest resonant frequency. FIG. 14 shows a corresponding plot for additional gravitational loading, corresponding to tilting all the way out to 90°, for another 4 flexure embodiment.

Figure 8:
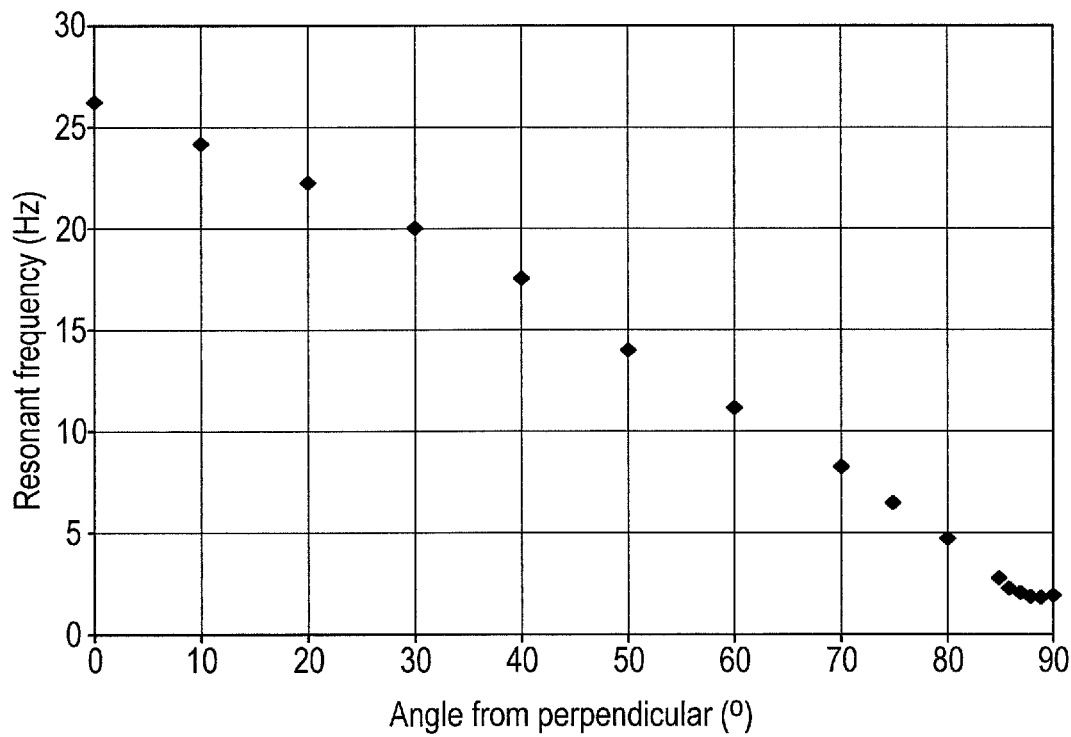
FIG. 8 shows a graph of the variation of the resonant frequency of oscillation of the proof mass for a 3 flexure embodiment of the invention, depending on the angle between the plane of oscillation of the proof mass and the plane perpendicular to the direction of the force due to gravity. The minimum in the resonant frequency arises from the third guiding flexure, resulting in a low resonant frequency device which is stable.

FIG. 8 shows a graph of the variation of the resonant frequency of oscillation of the proof mass 12 with respect to the frame 2 of the embodiment of FIG. 4, as the angle of the plane of oscillation (which in this case is parallel to the front surface of the frame 12) is increased from zero (zero here corresponding to perpendicular to the direction of the force due to gravity). The graph clearly shows a trend wherein the resonant frequency decreases with increased tilt angle. In a position with no tilt (i.e. the plane of oscillation lying horizontally) the resonant frequency is around 26 Hz, decreasing to just below 1.9 Hz when the device is tilted by 87°. This clearly shows the geometrical antispring effect.

As the device is tilted from 87°-90°, the guiding flexure 16a starts to limit the geometrical antispring causing the device to increase its resonant frequency. Thus there is a clear observation that the 3 flexure embodiment of the device generates a low resonant frequency which is inherently stable.

Figure 9:
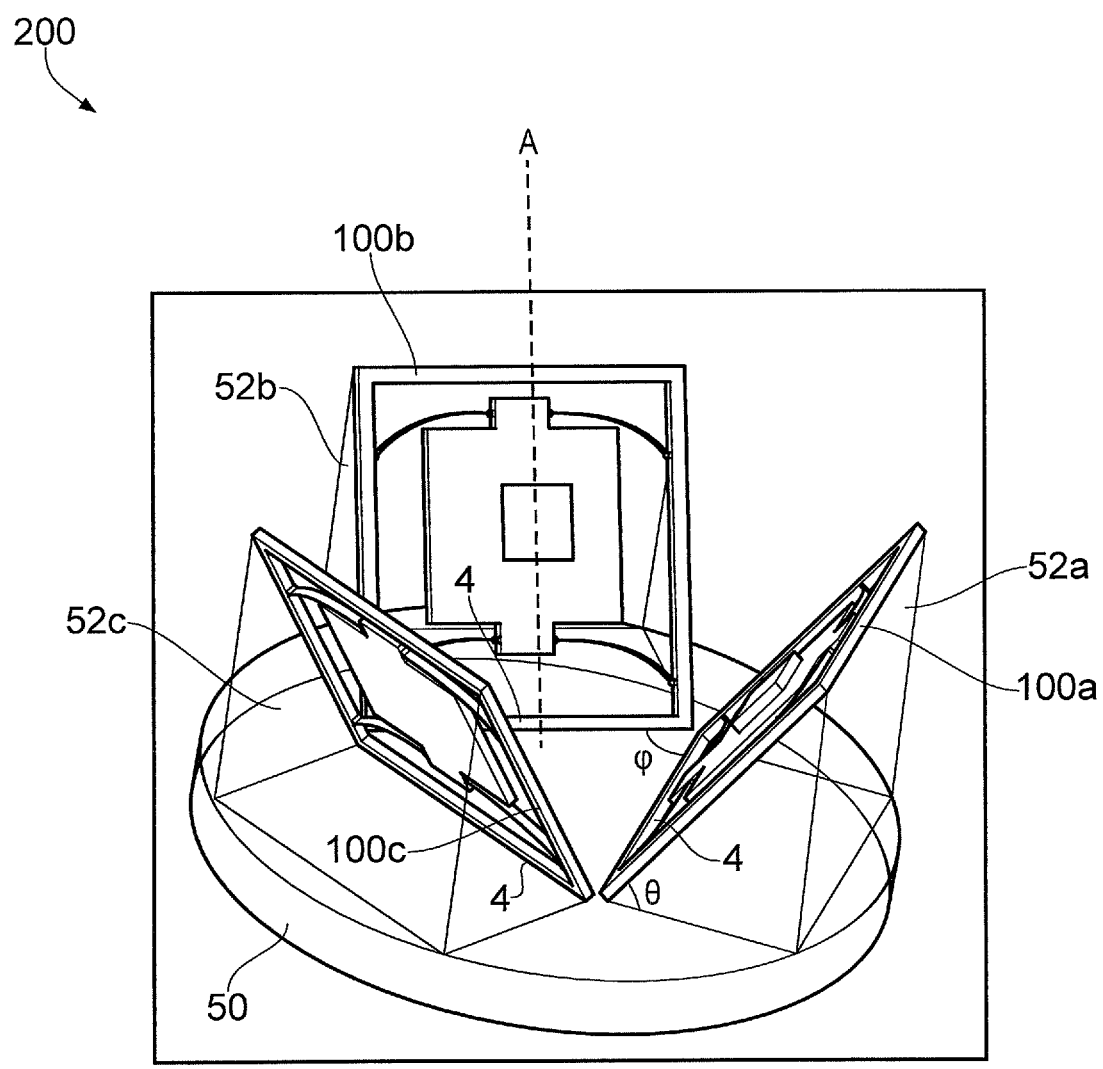
FIG. 9 shows a perspective view of an arrangement according to an embodiment of the fourth aspect of the present invention, made up of three devices according to an embodiment of the first aspect. This shows a 4 flexure embodiment, but a similar arrangement is possible with a 3 flexure embodiment

FIG. 9 shows an embodiment of an arrangement of three devices 100a, 100b, 100c. These devices are identical to each other. They differ from the device 100 of FIG. 1 only in the ratio $W_{PM}$:$H_{PM}$. This embodiment corresponds to the fourth aspect of the present invention. Each of the devices has a sensitive axis defined by the direction in which the proof mass is confined to oscillate in its plane of oscillation. In FIG. 4, none of these sensitive axes coincides. As a result, the arrangement 200 is sensitive to accelerations in three spatial dimensions. In order to more clearly define the geometry of the arrangement 200, the devices 100a, 100b, 100c are shown on the surface of a cylinder 50, and each forming the hypotenuse face of a right-angled triangular prism 52a, 52b, 52c. FIG. 9 shows an implementation using 4 flexure devices, but 3 flexure devices also function in a corresponding way.

In this embodiment, the angle φ between each of the three lower members 4 of the devices 100a, 100b, 100c is 60°. In this way, the lower members 4 of the devices 100a, 100b, 100c form an equilateral triangle pattern. The angle θ between each device and the surface of cylinder 50, in this case, is equal, and approximately 60°. [In fact, this angle is inverse tan(root(2))=54.7 degrees.] In such a manner, the three devices 100a, 100b, 100c are tilted outwards from a central axis A by an angle of (90−θ)°.

Figure 10:
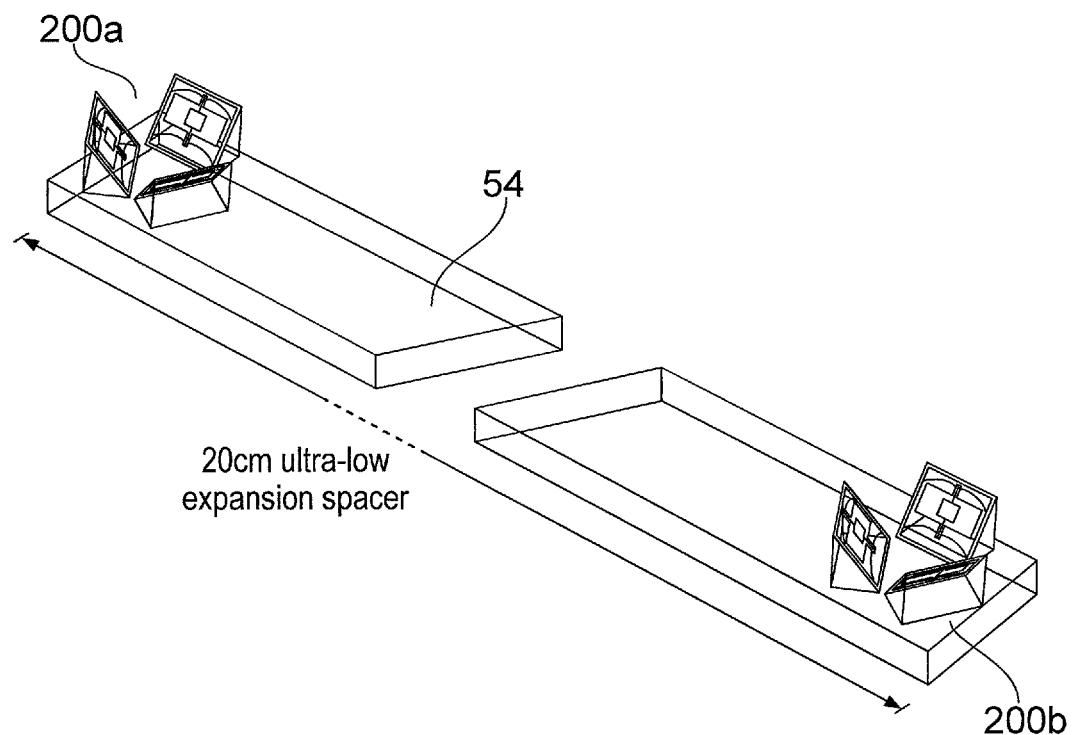
FIG. 10 shows a schematic view of a gradiometer configuration comprising two arrangements according to an embodiment of the fourth aspect of the invention. This shows a 4 flexure embodiment, but a similar arrangement is possible with a 3 flexure embodiment
Figure 11:
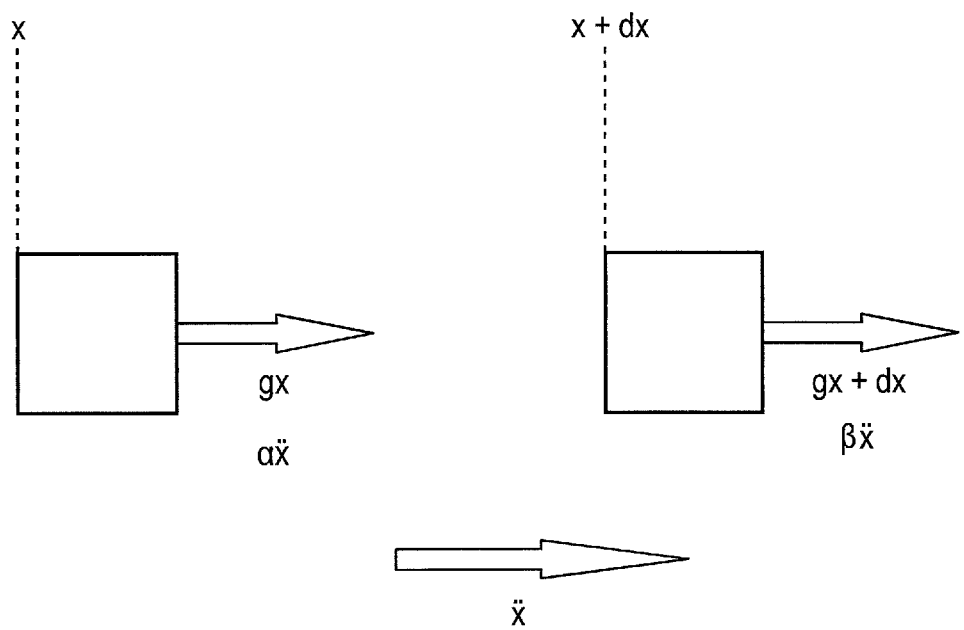
FIG. 11 shows a schematic diagram illustrating the operating principles of a gradiometer.
Figure 12:
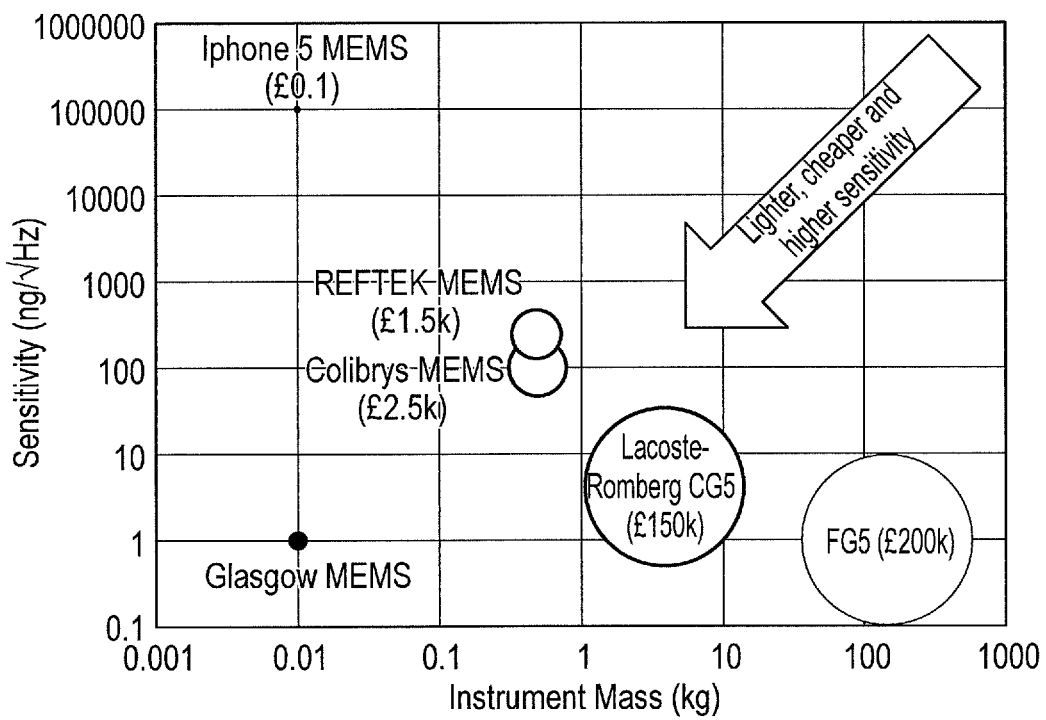
FIG. 12 shows a comparison of the cost, mass and sensitivity of known prior art gravimeters and accelerometers, as well as the values for a device according to the present invention.

FIG. 10 shows a gradiometer configuration made up of two arrangements 200a, 200b of the devices 100a, 100b, 100c shown in FIG. 9. These are separated by an ultra-low-expansion spacer 54. In this way, the gradiometer is configured to measure gradients in the gravitational field along the length of the spacer, from which the absolute value of the gravitational field can be calculated. FIG. 10 shows an implementation using 4 flexure devices, but 3 flexure devices also function in a corresponding way.

Figure 13:
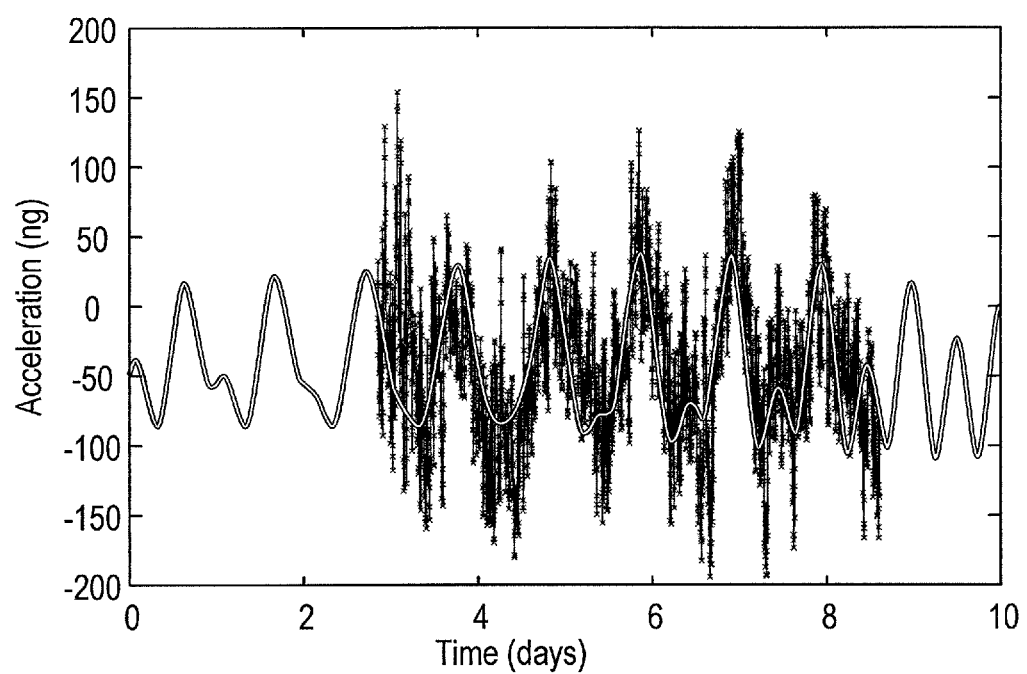
FIG. 13 shows a measurement of the Earth tides measured with a 3 flexure embodiment of the device. The device was operated in gravimeter configuration measuring the vertical component of the Earth's gravitational field. The twice daily variation in the Earth's gravitational field is clearly visible (the Earth tides) due to the relative gravitational attraction of the moon and sun. The device was operated on the ground with no vibration isolation, and seismic noise was filtered using a 30 s output filter

FIG. 13 shows a measurement of the gravitational Earth tides with a single device as illustrated in FIG. 4. From December 2014-March 2015 the system was left in continuous operation. The device was operated in a vertical configuration with a resonant frequency of 2.2 Hz. The temperature of the silicon wafer was maintained by a closed loop heater to within 1 mK of a target operating temperature while the proof mass position was read out with an optical sensor. The device was operated on the ground with no vibration isolation. The Earth tides are clearly visible in the results, The results show data from between 13 and 19 Mar. 2015. This is believed to be the first time such a measurement has been reported with a MEMS gravimeter.

Figure 15:
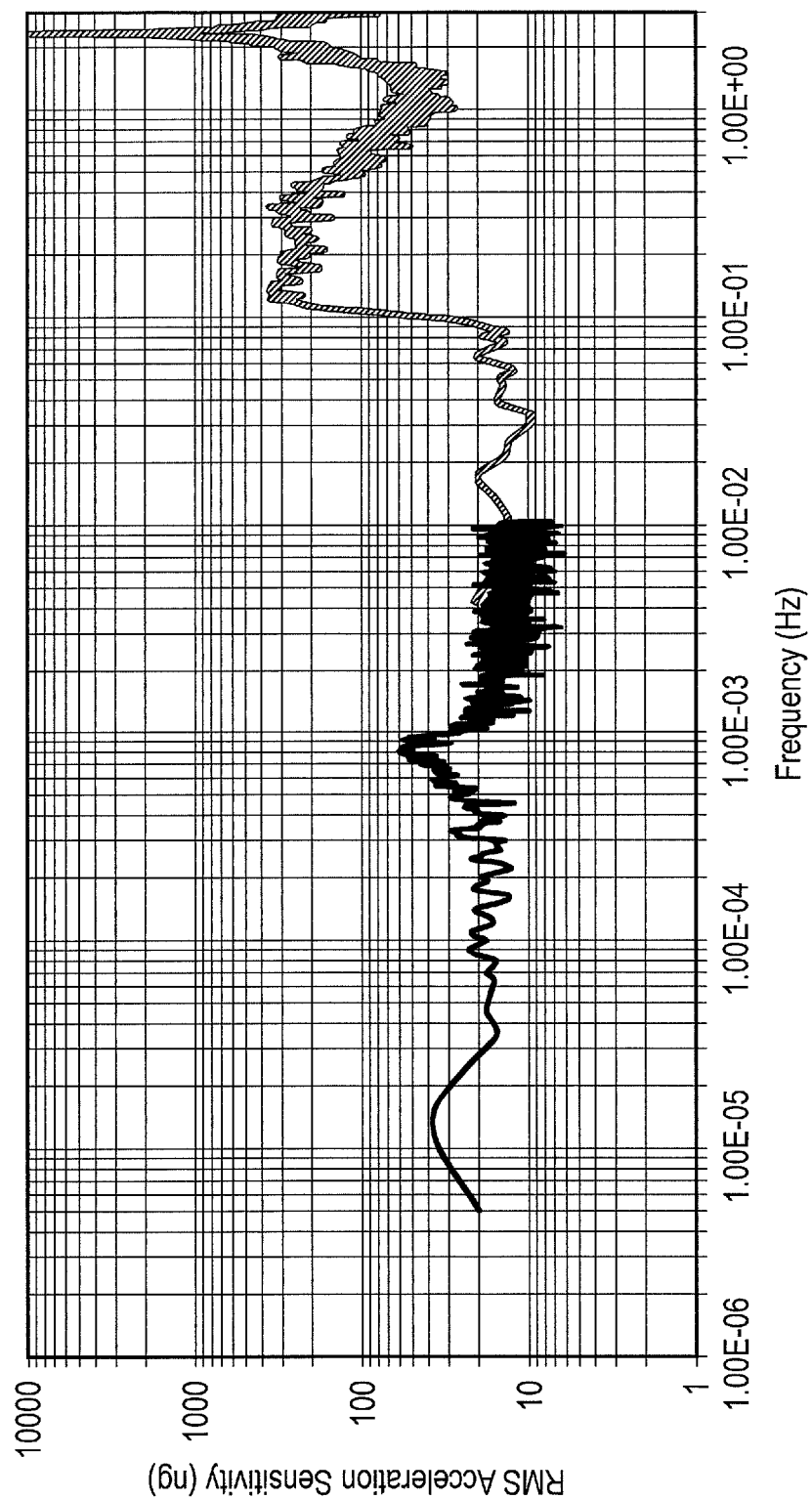
FIG. 15 shows a plot of the full frequency bandwidth of a device according to a 3 flexure embodiment of the invention.

FIG. 15 shows a plot of the full frequency bandwidth of a device according to a 3 flexure embodiment of the invention. This shows the tide signal at $10^{-5}$ Hz, the microseismic peak at 0.17 Hz, and the resonance at 2.2 Hz. Note that the peak at $10^{-3}$ Hz is an artefact of thermal control to which the device was subjected. This plot demonstrates the remarkable stability and bandwidth of the device.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An acceleration measuring device having a support and a proof mass, connected to each other by at least two flexures allowing displacement of the proof mass relative to the support, the support defining a space for displacement of the proof mass, the device being configured so that the modulus of the gradient of the force-displacement curve of the proof mass decreases with increasing displacement, for at least the part of the force-displacement curve corresponding to a range of movement of the proof mass within the device, wherein, the resonant frequency of oscillation of the proof mass is determined at least in part by the orientation of the device relative to the direction of the force due to gravity, such that the proof mass is capable of oscillating with a resonant frequency of 10 Hz or less, and wherein the proof mass has a mass of less than 0.1 grams, and wherein the modulus of the gradient of the force-displacement curve is the mathematic modulus of the gradient, $|dF/dz|$, of the force-displacement curve with force, F, plotted on the ordinate, and displacement, z, plotted on the abscissa,
wherein the support, proof mass and flexures define a plane of the device, corresponding to a plane of oscillation of the proof mass,
wherein each flexure has a rest shape extending in a continuous arc defining a length direction of the flexure from the support to the proof mass, and a width direction of the flexure is defined as a direction in the plane of oscillation of the proof mass and perpendicular to the length direction, and a depth direction of the flexure is defined as a direction perpendicular to the plane of oscillation of the proof mass and perpendicular to the length direction, and wherein the width of the flexure on average along the length of the flexure, is at most 10 μm and the depth of the flexure on average along the length of the flexure, is at least 150 μm.

2. The device according to claim 1 wherein the resonant frequency of oscillation of the proof mass decreases as the device is tilted out of the plane perpendicular to the direction of the force due to gravity.

3. The device according to claim 1 wherein each flexure is connected at one end to the proof mass, and at the other end to the support.

4. The device according to claim 1 wherein the length of each flexure is at least 25% of the distance between opposing sides of the support.

5. The device according to claim 1 including three flexures.

6. The device according to claim 1 wherein the device is configured to allow the proof mass to oscillate substantially only in one plane.

7. The device according to claim 6 wherein each flexure has a rest shape extending in a continuous arc defining a length direction of the flexure from the support to the proof mass.

8. The device according to claim 7 wherein:
a width direction of the flexure is defined as a direction in the plane of oscillation of the proof mass and perpendicular to the length direction; and
a depth direction of the flexure is defined as a direction perpendicular to the plane of oscillation of the proof mass and perpendicular to the length direction; and at least one of (i), (ii) and (iii) applies:
(i) the ratio of the depth of the flexure to the width of the flexure, on average along the length of the flexure, it at least 10:1;
(ii) the width of the flexure on average along the length of the flexure, it at most 10 μm;
(iii) the depth of the flexure on average along the length of the flexure, is at least 150 μm.

9. The device according to claim 7 wherein each flexure has a cross sectional shape perpendicular to the length direction of the flexure, the shape having a width which varies with depth.

10. The device according to claim 7 wherein each flexure has a substantially rectangular cross sectional shape perpendicular to the length direction of the flexure.

11. An arrangement of three or more of the devices according to claim 6, wherein the devices are oriented in such a manner that no two planes of oscillation of the proof mass are parallel to each other.

12. A gradiometer comprising an array of arrangements of devices according to claim 11.

13. The device according to claim 1 wherein the support and flexures are integrally formed.

14. The device according to claim 13 wherein the support, flexures and proof mass are integrally formed.

15. The device according to claim 1 wherein the device is manufactured by a subtractive process from a monolith.

16. The device according to claim 1 further including actuation means adapted to counter displacement of the proof mass by applying a counteracting force.

17. A gradiometer including an array of devices according to claim 1.

* * * * *